June 14, 1949.  D. M. BUFFINGTON  2,473,092
HOSE CLAMP
Filed Sept. 22, 1947

Inventor
Don M. Buffington
By
A. F. Flournoy
Attorney

Patented June 14, 1949

2,473,092

UNITED STATES PATENT OFFICE 2,473,092

HOSE CLAMP

Don M. Buffington, Grandfalls, Tex.

Application September 22, 1947, Serial No. 775,553

7 Claims. (Cl. 285—86)

1

My invention relates to hose clamps generally, but more particularly to a device of this type which will serve to hold a flexible hose firmly in position on its connecting member against a high fluid pressure.

In prior art devices of this type considerable difficulty has been experienced, especially in the use of high pressure hoses in rotary drilling, in that the hose would spring a leak under the high pressures applied and sometimes a hose would even be blown away entirely because the hose clamp was not properly designed to hold it to its connecting member.

It is therefore an object of my invention to provide a high pressure hose clamp which may be economically manufactured and easily installed for use on a high pressure hose.

It is another object of my invention to provide a hose clamp which is provided with a metallic mandrel adapted to be positioned inside the hose and a sleeve mounted on the outside end of the hose to prevent rupturing or otherwise damaging the same upon applying the clamp.

A further object of my invention is the provision of a novel tightening means whereby the clamp is drawn against the hose and the connecting element is pressed into the hose and simultaneously, thereby insuring the hose against any possible leakage.

With these and other objects in view, my invention lies in the combination of parts set forth by the following detailed description and illustrated in the accompanying drawings in which.

Figure 1:
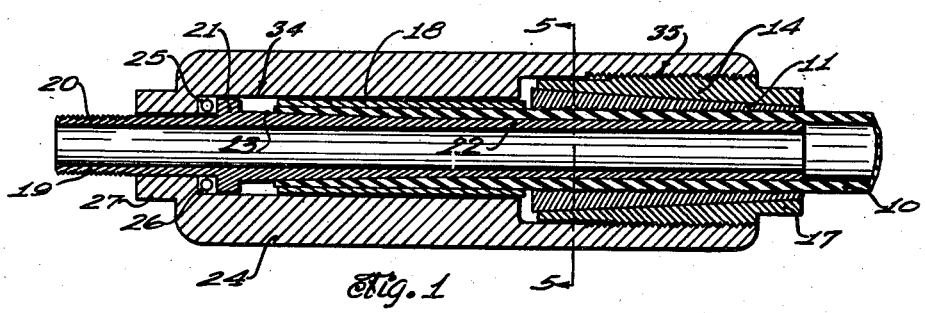
Fig. 1 is a longitudinal sectional view through a device embodying my invention in a high pressure hose clamp.
Figure 2:
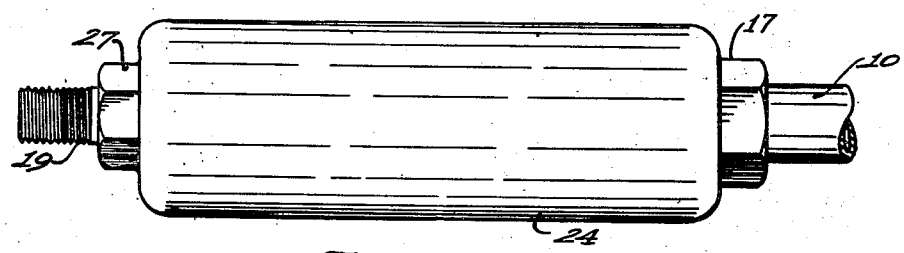
Fig. 2 is a side elevational view thereof.
Figure 4:
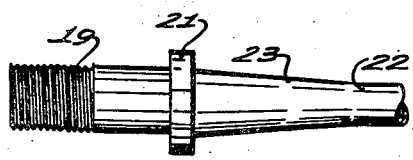
Fig. 4 is a partially broken side view of the connecting element of my device.
Figure 3:
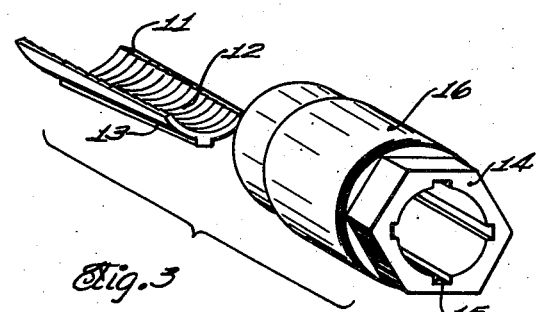
Fig. 3 is an exploded view showing the threaded bushing element and one of the clamping jaws used with the same.

In the drawings numeral 10 designates the end portion of a high pressure hose to which my device is connected. Positioned radially around the outside peripheral wall surface of the hose 10 are four slip jaws 11. These slip jaws 11 are circular segments provided with serrations or teeth 12 on their inner surface arranged to engage the outside surface of the hose 10 as will be subsequently described. The jaws 11 are similarly

2 constructed, being tapered longitudinally and each provided with a raised key 13 along the linear peripheral surface thereof. The jaws 11 are adapted to be positioned into a tapered bushing 14 having an inside taper to match the taper of the slip jaws 11. The bushing 14 is also provided with keyways 15 to receive the keys 13 of the slip jaws 11. The bushing 14 is further provided with external threads 16 and a hexed portion 17 on its outer end.

Arranged to be slipped over the end of the hose 10 is an external sleeve 18, the primary purpose of which is to prevent the end of the hose from splitting.

The connecting element, designated generally by the numeral 19, is provided with the usual threaded outer end 20 and a peripherally disposed flange 21. The main body portion 22 of the connecting element is arranged to be slipped up into the inside of the hose for the full length of the entire clamping device. In this manner the body 22 serves as a mandrel to prevent the hose 10 from buckling or rupturing when it is tightened by the slip jaws 11. The forward end of the body 22 is provided with a tapered portion 23 which, when being pressed into the hose 10, forces or wedges the same against the outside sleeve 18, thus sealing the hose against leakage and at the same time preventing any rupturing of the hose fibers as frequently occurs in the use of prior art hose clamps.

Numeral 24 designates an outside tightening sleeve provided with inside bores suitable for embracing all of the above mentioned elements. The rear end of the sleeve 24 is provided with internal threads adapted for engagement with those of the tapered bushing 14. The forward end is provided with a counterbore forming a shoulder 25 adapted for engagement with a radial thrust bearing 26 placed between it and the flange 21 of the connecting element 19. Suitable clearances have been left between the outside tightening sleeve 24 and the connecting element 19 and the external sleeve 18. Thus there is little frictional resistance to the free turning of the sleeve 24 upon engaging the same with the threads of the tapered bushing 14. The outer end of the sleeve 24 is also provided with a hex 27 adapted to receive a wrench for tightening the same upon a high pressure hose.

The following description of the assembly of my device as applied to a high pressure hose will point out more clearly to the reader the simplicity thereof and the numerous advantages.

In assembling my invention to the end of a high pressure hose, an operator will note first of all whether the end of the hose is frayed or otherwise dangerously ruptured. If so, he will, of course, trim off or cut away such portions until a solid structure is encountered. He then slips the tapered bushing 14 over the hose and inserts the tapered slip jaws 11. Since all of the jaws 11 are duplicates of one another, he does not concern himself with trying to position them in any radial order, the radial position being automatically held by the key 13 and the keyway 15 as formerly described. The operator then slips the external sleeve 18 over the end of the hose leaving a small space between the inner end thereof and the forward end of the slip jaws 11, the outer end of the sleeve 18 being brought approximately flush with the outer end of the hose 10. The connecting element 19 is then inserted into the hose 10 and pressed lightly until the tapered portion 23 begins to wedge the end of the hose against the outside sleeve 18. The operator then slips the outside tightening sleeve 24 carrying the thrust bearing 26 over the connecting element 19 and engages the threads therein with the threads of the tapered bushing 14. With a wrench applied to the hex 17 on the tapered bushing 14, the operator holds the device while he tightens the outside sleeve 24 by applying another wrench to the prepared hex 27. Upon this turning, the bushing 14 will be advanced forwardly along the hose 10, the inside taper creating a tremendous pressure against the slip jaws 11 and causing the inside teeth 12 thereof to embed themselves in the outer surface of the hose 10. Note, however, that this tightening in no way buckles or ruptures the corded fabric of the hose, due to the presence of the long body portion 22 of the connecting element 19 which acts as a mandrel to counteract such buckling or rupturing. Whereas former devices have been provided with threaded jaws which required a threaded, rotatable bushing element, I have dispensed with all radial movements of the jaws and bushing element, thus eliminating undue radial distortion of the hose that might cause a rupture of the fabric. I have so arranged my bushing 14 and slip jaws 11 that the entire pressure is exerted in inward, radial directions at right angles to the length of the hose, pressing the same against the inner body 22 of the connecting element 19.

Working simultaneously with the action of the slip jaws 11, the shoulder 25 of the tightening sleeve 24 presses against the radial thrust bearing 26 which engages the flange 21, thus pressing the tapered portion 23 of the connecting element 19 tighter and tighter into the end of the hose 10. Neither is there any radial movement of the connecting element 19, but simply a slow wedging of the outer end of the hose 10 against the external sleeve 18. Since I have incorporated the use of a radial thrust bearing 26, the outside sleeve 24 is free to turn and will be overcome only by the frictional resistance of the wedging action between the taper 23 as it presses the hose 10 against the outside sleeve 18. Thus I have doubly sealed the hose against possible leakage by the action of the slip jaws 11 and by the action of the connecting member 19.

The clamp of my invention is effective for high pressure operation by reason of the two spaced elongated sealing zones which are provided between the hose 10 and the body 22 of the connecting element 19. One of these elongated sealing zones is established adjacent the internal bore 34 of sleeve 24 by the operation of the cylindrical external sleeve 18. The other sealing zone is established adjacent the counterbore 35 by the operation of the elongated longitudinally extending tapered wedges 11. Thus the longitudinally extending tapered wedges 11 remote from the end of the hose effect a sealing relation between the hose and the body portion 22 of the connecting element 19, remote from the end of the hose, while the external sleeve 18 adjacent the end of the hose, insures sealing relation between the hose and the body portion 22 of the connecting element 19. To eliminate possibilities of break-down, the sleeve 24 has an elongated solid external wall extending the full length of the tubular portion of the connecting element 19.

Figures 5, 6:
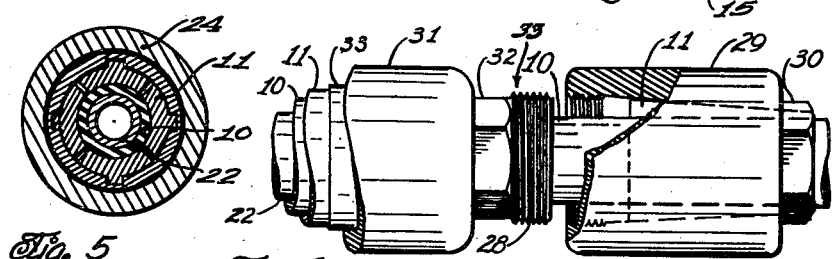
Fig. 5 is a cross sectional view taken along lines 5—5 of Fig. 1.
Fig. 6 is a broken view showing a portion of my invention in modified form.

In Fig. 6 of the drawing I show a portion of my invention in modified form. In this instance the tightening sleeve 31 is a duplicate of the sleeve 24. The modified bushing 33, however, is provided with a hex 32 on its outer end and an extending threaded stud portion 28 which is adapted to be engaged by an internally threaded sleeve 29. This sleeve 29 is provided with an internally tapered bore corresponding to the tapered bushing 14 in the preferred type and arranged to receive an additional set of slip jaws 11. The sleeve 29 is further provided with a hexed portion 30 on its rear end suitable for use with a wrench for tightening it on the engaging threads 28 of the modified bushing 33.

In assembling the modified type on a section of high pressure hose, it is preferred that a connecting element 19 be used which has a tubular body portion 22 long enough to extend under the slip jaws of both the forward bushing 33 and the additional sleeve 29. With the connecting element in position in the hose, the modified sleeve 29 and its set of slip jaws 11 are placed over the hose. The modified bushing 33 is now placed over the hose and its threaded stud 28 engaged with the forward threaded end of the modified sleeve 29. By holding the hex and 30 stationary with a wrench, the modified bushing 33 is made tight in the sleeve 29, causing the teeth of the slip jaws 11 to embed themselves into the hose, clamping it against the body 22 of the connecting element 19.

The forward end of the device is then assembled. A set of slip jaws 11 are placed into the modified bushing 33, the sleeve 18 is placed over the end of the hose and the collar 24 is brought into threaded engagement with the bushing 33 and the assembly made up as described in the preferred type of my invention.

The purpose of this additional tightening means is to insure the clamping device from being blown from the hose end by extremely high pressures that might be occasionally used. It is also within the scope of my invention to provide another threaded stud to the rear end of the additional sleeve 29 above the hex 30, whereby additional duplicate clamps may be positioned along the hose.

It will be noted that the slip jaws 11 are never allowed to rotate around the hose where the teeth 12 might cut or otherwise injure the hose, but are brought into gripping contact with the hose by the action of the longitudinally moving sleeve 29 and bushing 14. Since the gripping contact is made by longitudinally moving parts, there is never any radial torque exerted on the hose which might rupture the fabric or cause one of the joints to work loose due to the hose springing back to its normal position.

While I have described my invention both in a preferred and modified form, it is to be understood that the various parts thereof may be changed in size to fit different diameters of the hose, and that the various elements used may change in shape to suit a manufacturer's design or to facilitate the machining thereof.

Having thus described my invention, I claim:

1. A hose clamp comprising a cylindrical bushing adapted to be positioned over a hose in a position displaced from one end thereof, said bushing being provided with a tapered bore having a minor diameter larger than the major diameter of the hose, a plurality of wedges of arcuate cross-section and tapered longitudinally adapted to be positioned within the bore of said bushing encircling the hose in the position displaced from one end thereof, said wedges provided with teeth on their under sides adapted to be embedded in the peripheral wall surface of the hose, a connecting element having a hollow cylindrical shank projecting into the open end of the hose whereby said shank is extended beneath said wedges to act as a mandrel therefor, an external sleeve having one end thereof disposed in threaded engagement with said bushing and operative to move the same with respect to said sleeve whereby said wedges may be forced into gripping contact with the outer surface of the hose, and a cylindrical member enveloping the end of said hose adjacent said wedges and confined in sealing relation to said hose by said external sleeve.

2. A hose clamp comprising an externally threaded cylindrical bushing adapted to be positioned over a hole in a position displaced from one end thereof, a plurality of wedges of arcuate cross-section and tapered longitudinally slidably mounted within the bore of said bushing and adapted to encircle the hose, a hose connecting element having an elongated shank adapted to be inserted into the open end of a hose and extended beneath said wedges to act as a mandrel therefor, said connecting element provided with a flange, an elongated external sleeve provided with a threaded bore at one end adapted for engagement with said bushing, said sleeve being also provided with a counterbore forming an internal shoulder intermediate the ends thereof, said bushing and said wedges constituting a locking means in co-action with said sleeve to maintain a hose slipped over said connecting element steady at a position displaced from the end of the hose to enable said sleeve to progressively advance said connecting element into the hose as the collar is threadedly advanced along said bushing, and a cylindrical member enveloping the end of said hose adjacent said wedges and confined in sealing relation to the end of said hose by said elongated external sleeve.

3. A hose clamp comprising a cylindrical bushing adapted to be positioned over a hose in a position displaced from one end thereof, said bushing being provided with a tapered bore having a minor diameter larger than the major diameter of the hose, a plurality of longitudinally tapered wedges of arcuate cross-section and tapered longitudinally slidably mounted within the bore of said bushing and encircling the hose at a position displaced from the end of the hose, means for circumferentially spacing said wedges in said bushing, a hose connecting element having an elongated shank inserted into the open end of the hose and extended beneath said wedges to act as a mandrel therefor, an external sleeve adjustably disposed in threaded engagement with said bushing, said sleeve having a counterbore defining an internal shoulder, said shank having a tapered forward end and a peripherally disposed flange, a removable cylindrical member externally mounted on the outer end of the hose adjacent the position in which said wedges engage the hose, said sleeve having a threaded bore at one end threadedly engaging said bushing to correspondingly effect an engagement of the shoulder therein with the peripherally disposed flange of said connecting element whereby the tapered portion of said shank operates to wedge the walls of the end of said hose in sealing relation against said externally mounted cylindrical member.

4. A hose clamp comprising an externally threaded cylindrical bushing adapted to be positioned over a hose in a position displaced from one end thereof, said bushing being provided with a tapered bore having a minor diameter larger than the major diameter of the hose, said bushing being also provided with internally positioned, radially spaced keyways, a plurality of longitudinally tapered wedges of arcuate cross-section slidably mounted within the bore of said bushing and encircling the hose, each of said wedges being provided with a raised key disposed longitudinally thereon and fitting into a keyway of said bushing, a removable sleeve externally mounted on the end of the hose and terminating forwardly of said bushing and said wedges, a hose connecting element comprising a tubular fitting provided with a peripherally disposed flange at a medial portion of its length dividing it into two sections, one of said sections of said fitting being provided with an externally tapered portion near said tapered flange, said portion verging into a straight tube portion extending to the end of said section and insertable into the open end of the hose and extended beneath said wedges to act as a mandrel for the same, a sleeve member having a bore adapted to be slidably and rotatably positioned on the other section of said fitting, a counterbore in said sleeve member forming an internal shoulder, said sleeve member being provided with a threaded bore at one end for receiving said bushing to effect an engagement of the internal shoulder therein with an anti-friction bearing disposed between the same and the flange of said fitting whereby an advancing movement of said sleeve member along said bushing effects a movement of the tapered portion of said fitting to wedge the walls of the end of the hose against said removable externally mounted sleeve and against the counterbore of said sleeve member and whereby the simultaneous movement of said bushing forces the teeth of said wedges into the peripheral wall surface of the hose displaced from the end thereof to clamp the same against the internally positioned tube portion of said fitting.

5. A hose clamp comprising an externally threaded cylindrical bushing adapted to be positioned over a hose in a position displaced from one end thereof and provided with a tapered bore, said bushing having a pair of flat tool applying faces for turning the same, a plurality of wedges slidably positioned within the bore of said bushing, means for circumferentially spacing said wedges in the same, said wedges being provided with teeth on their underside adapted to grip the outer surface of the hose when wedged between the same and the inner tapered bore of said bushing as it moves forwardly over said wedges an external sleeve member internally threaded on one end for threaded engagement with said bushing, said sleeve member being provided with a pair of oppositely spaced flat tool applying faces for engagement by a wrench or the like, stop means for said sleeve member comprising a tubular fitting provided with a flange, a length of said tubular fitting being projectable into the open end of the hose to a position where the flange will engage the end of the hose, said sleeve member being rotatably mounted on another length of said fitting extending beyond said flange, whereby said bushing may be maintained stationary by a wrench or the like while said sleeve member is rotated by a wrench or the like for advancing the same on said bushing to effect a movement of said wedges radially into gripping contact with the hose at a position displaced from the end thereof, and an elongated cylindrical seal between the end of said hose and said external sleeve member.

6. A device as claimed in claim 5 wherein said bushing terminates at its outer end in an externally threaded portion, said threaded portion establishing threaded engagement with an additional internally threaded collar adapted to be slipped over the hose, said collar being provided with a tapered bore, a plurality of longitudinally tapered wedges of arcuate cross-section slidably mounted in said additional collar and adapted to encircle the hose, means for spacing each of said wedges circumferentially within said additional collar to permit only longitudinal and radial movements thereof, and wherein said tubular portion of said tubular fitting is made long enough to extend into the open end of a hose beneath the wedges mounted in said additional collar to act as a mandrel for the tightening of the hose thereagainst.

7. A hose clamp for high pressure hose comprising an elongated sleeve having an internal bore and counterbore extending axially therein, said bore having an internal shoulder adjacent one end thereof, a tubular connecting member having a screw-threaded end extending through said shoulder, a flange on said connecting member forming an abutment with said shoulder, said tubular connecting member projecting the entire length of said bore and counterbore and forming an elongated mandrel, a hose having the internal end thereof extending over said mandrel substantially throughout the length of said bore and counterbore, a confining elongated sleeve member extending over the external end of said hose and effecting sealing relation of said hose with the interior of the bore of said sleeve, a multiplicity of longitudinally tapered wedges of arcuate cross section engaging the exterior of said hose in a position transversely aligned with the counterbore of said sleeve and adjacent one end of said sleeve member and means engaging the counterbore of said sleeve and operative against said longitudinally tapered wedges for forcing said wedges into intimate connection with said hose whereby two spaced elongated sealing zones are provided between the interior wall of the hose and the external surface of the mandrel, one of said sealing zones extending adjacent the bore of said sleeve and the other of said sealing zones extending adjacent the counterbore of said sleeve.

DON M. BUFFINGTON.

REFERENCES CITED

The following references are of record in the file of this patent:

UNITED STATES PATENTS

| Number | Name | Date |
|---|---|---|
| 1,863,870 | Moore | June 21, 1932 |
| 1,876,639 | Disler et al. | Sept. 13, 1932 |
| 2,120,275 | Cowles | June 14, 1938 |